Aug. 26, 1958     M. KOULIKOVITCH     2,848,921
APPARATUS FOR MEASURING VERY LITTLE LENGTHS
Filed May 11, 1953     2 Sheets-Sheet 1

Inventor
Miron Koulikovitch
By Young, Emery & Thompson
Attys.

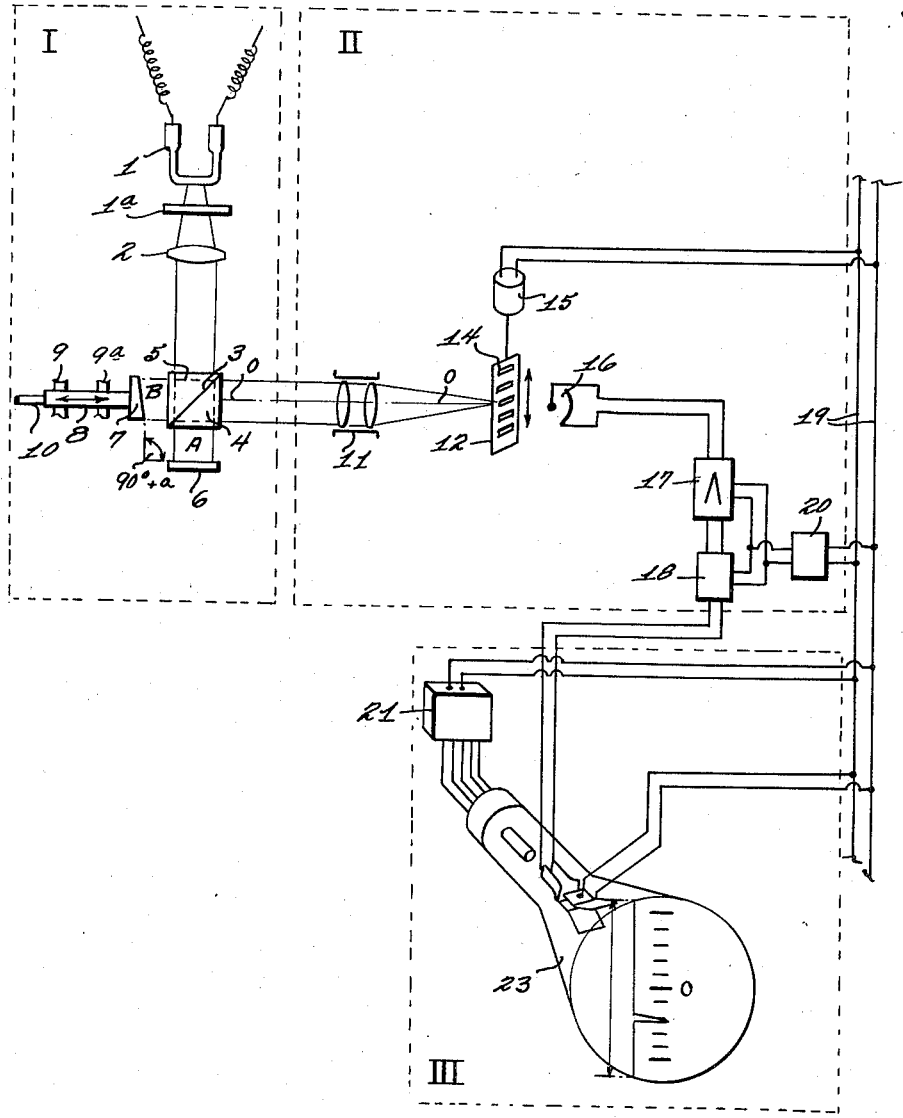

United States Patent Office 2,848,921
Patented Aug. 26, 1958

2,848,921

APPARATUS FOR MEASURING VERY LITTLE LENGTHS

Miron Koulikovitch, Geneva, Switzerland, assignor to Societe Genevoise d'Instruments de Physique, Geneva, Switzerland, a corporation of Switzerland Application May 11, 1953, Serial No. 354,009

Claims priority, application Switzerland June 11, 1952

4 Claims. (Cl. 88—14)

To measure very little lengths, there has been used till now interferometers, such as those of Michelson, Benoît-Fabry-Perrot and others, which are essentially optical instruments having no reading device permitting the direct reading of the measured value.

The optical part of these known apparatuses comprises in particular a monochromatic source of light, a movable mirror and an observation telescope. The method of measure is grounded upon the fact that by displacing the movable mirror along a distance equal to the length to be measured, one observes through the telescope a certain number of practically equidistant interference fringes alternately dark and brilliant which cross the field. Each brilliant fringe takes exactly the place of the preceding for a displacement of the mirror equal to half of the wave-length of the light rays sent out by the source. By counting the number of fringes cross the field and knowing the wave-length of the monochromatic light used, it is feasible to calculate very exactly the value of the displacement of the movable mirror or of a carrier onto which said mirror is fastened.

This method of measure takes time and requires very great attention from the observer. Besides, said method is not accommodated to the measure of very little lengths, less than half of a wave-length for example. Indeed, the optical definition of the interference fringes is defective, so that the precise position of said fringes is difficult to locate.

The present invention concerns an apparatus for the measure of very little lengths which tends to obviate to these drawbacks by the fact that it comprises in combination an interferometer of the Michelson type having a movable mirror and presenting parallel fringes, a measuring device and a photo-electric sighting device comprising an opaque reticule submitted to a movement of sustained oscillations and provided with transparent slits corresponding in the shape and the geometric position, to the brilliant fringes of the interferometer, an object-glass projecting on the reticule the fringes of the interferometer, a photo-electric cell intercepting the light rays crossing the reticule, an electronic device converting the currents issued from the photo-electric cell and consecutive to the fluctuations of the intercepted light flux, in impulses of very short duration, in order that at each coincidence of the brilliant fringes with the slits which occurs during the oscillating movement of the reticule, the light flux crossing said reticule impinges the photo-electric cell which controls, by the intermediary of the electronic device, the emission of impulses acting on the measuring device which indicates the ratio of the elapsed times between two successive coincidences occuring during a whole period of the oscillating movement of the reticule, whereby said ratio is a function of the amplitude of the displacement of the movable mirror of the interferometer.

The attached drawing represents schematically and by way of example a form of execution of the object of the invention.

Fig. 3 is a schematic illustration of another embodiment of the apparatus of the invention.

Figure 1:
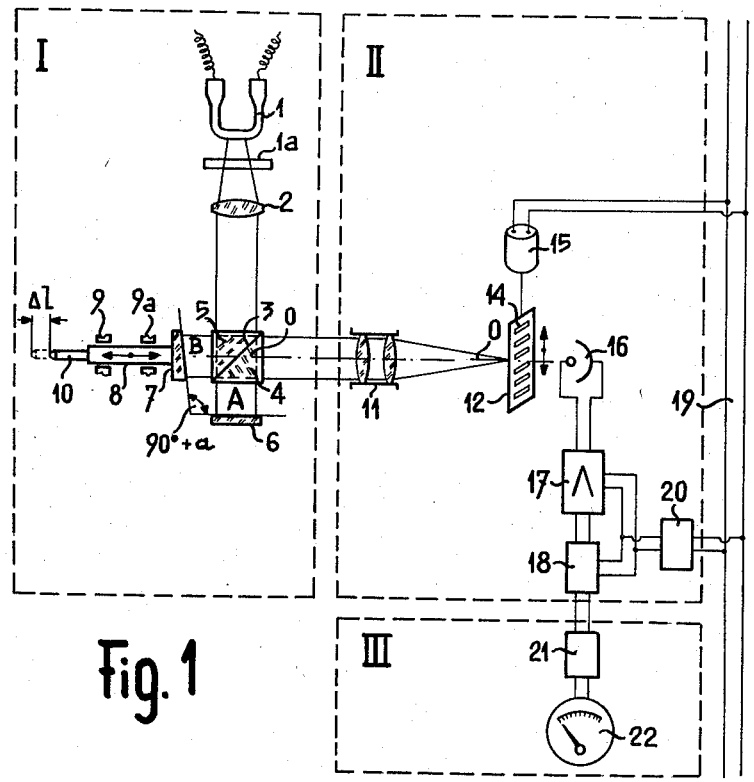
Fig. 1 is a schematic illustration of the apparatus.

The apparatus represented comprises:

(a) An interferometer I;
(b) A photo-electric sighting device II;
(c) A measuring device III.

The interferometer of known type presents a monochromatic flashing device comprising a source 1, a filter 1a and a condenser 2. The beam of parallel monochromatic rays falls onto a semi-transparent surface 3 inclined at 45° with respect to the incident beam and formed by the faces in contact of two identical right-angled prisms 4 and 5, covered with a semi-transparent layer. A part A of the incident rays crosses said surface 3, meets an orthogonal mirror 6 which reflects said rays back again to the surface 3. The other part B of the incident rays is deflected 90° by the surface 3, and then is reflected back again to said surface by a mirror 7 which includes, by construction, with the mirror 6, an angle of 90°+a, slightly different from 90°.

The mirror 7 fastened to a carrier 8 is angularly fixed but axially displaceable. Said carrier is guided by means of two guides 9 and 9a and carries for example at its outer extremity a feeler 10. A mechanism of precision of any kind, not represented, allows to displace axially the carrier 8 and the feeler 10 over very little lengths, from a position chosen as the zero point. Said little length Δl is represented much enlarged on the drawing for more clearness.

The photo-electric sighting device II comprises an object-glass 11 disposed on the optical axis 0—0 of the interferometer. Said object-glass 11 takes again the rays reflected by the mirrors 6 and 7 and projects said rays onto the reticule 12 perpendicular to the optical axis 0—0.

Figure 2:
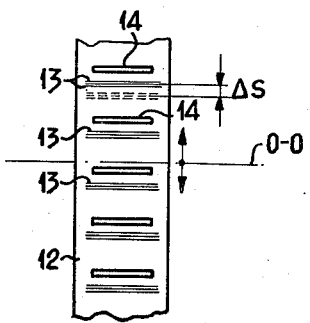
Fig. 2 shows the disposition of the transparent slits of the reticule and of the interference fringes projected onto the opaque reticule by an object-glass.

The optical paths travelled through by the corresponding rays of the beams A and B are not exactly of the same length. Consequently, it appears onto the reticule 12 provided with the slits 14, a range of interference fringes alternately dark and brilliant, the spacing and the straightness of which are a function of different factors such as the angle a, the quality of the even surface of the mirrors and the wave-length of the used light. In the Fig. 2 only the brilliant fringes are indicated at 13. Any displacement of an amplitude Δl, even very little, of the feeler 10, has for result a proportional transverse shifting Δs (Fig. 2) of the fringes 13 on the reticule 12.

The shape and the geometric position of the slits 14 correspond to the shape and the geometric position of the fringes 13.

An electro-magnet 15 fed by a net 19 of distribution of alternating current, drives the reticule 12 in a to and fro periodical movement symmetric on one and the other sides of the optical axis 0—0. In a variant of execution, the reticule could be driven in such a movement of sustained oscillations by means of any other driving device of known kind.

The respective position of the described members is defined in such a manner that for a given position of the feeler 10, chosen as the zero point of its displacements, the reticule is located in a middle position with the slits centered on the optic axis 0—0. For said middle position, the elongation of the oscillations is equal to zero and the successive coincidences of the slits and of the fringes occur at equal time intervals. On the contrary, for any other position of the mirror 7, consecutive to a displacement of the feeler 10, the position of the fringes on the reticule 12 is shifted with respect to the middle position of the oscillations of the reticule and the coincidences of the fringes and the slits succeed each other at unequal time intervals. One can admit that said inequality of times is proportional to the shifting of the fringes and, consequently, to the displacement of the feeler 10 with respect to the position chosen as the zero point.

The luminous flux of the brilliant fringes, crossing the reticule at each coincidence of the fringes with the slits, is collected by a photo-electric cell 16. The fluctuations of the current emitted by said cell and caused by the fluctuations of the luminous flux intercepted, are amplified and converted in impulses of very short durations or in instantaneous impulses by means of an electronic device 17 and 18 of known kind and fed by the net 19 and a rectifier 20. Such an electronic device is described for example in the Swiss Patent No. 257,310.

The measuring device III comprises on the one hand an electronic commutator 21 of known kind and object of the Swiss Patent No. 280,542 controlled by the instantaneous impulses emitted by the photo-electric sighting device II and on the other hand by a reading instrument 22 constituted by a measuring instrument for direct current. Said reading instrument, which presents a great mechanical or electrical inertia, translates the inequality of the times elapsing between the impulses emitted during a whole period of the movement of oscillation of the reticule 12, in measure of the displacement of the feeler 10 with respect of the zero point chosen.

Thus, in said apparatus, the more or less sharpness of the fringes has no effect upon the precise definition of their position, since the fluctuations of the currents caused by the fluctuations of the fluxes intercepted by the photo-electric cell are converted, by means of the electronic device, in instantaneous impulses, which are always emitted to the same moment with respect to the fluctuation of the current, i. e. with respect to the coincidence of the fringes 13 and of the slits 14. It follows that, the described apparatus allows to measure with a very great precision, displacements of very little amplitudes even less than the half wave-length of the monochromatic rays of the flashing device of the interferometer I.

One form of execution of an apparatus according to the invention has been described here by way of example, but it is clear that the described interferometer may be substituted by any other interferometer of known kind. It is the same for the photo-electric sighting device and for the measuring device. Said latter, may for example, comprise on the one hand, a light source fed by means of the instantaneous impulses and on the other hand a stroboscopic device comprising a scale and rotative marks allowing to render visible the time differences elapsing between the flashes of light emitted by the light source. Such a measuring device being described in the Swiss Patent No. 224,987, and U. S. Patent No. 2,401,712, it is useless to describe it here in detail.

The measuring device may also comprise an oscillograph supplied by the instantaneous impulses. Such an oscillograph may, as described in the Swiss Patent No. 281,171, comprise a cathodic ray tube, the spot of which, shifted in synchronism with the reticule, is influenced by the impulses emitted by the electronic device. Such an arrangement is shown in Fig. 3, wherein the interferometer I and the photo-electric sighting device are as above described, and the measuring device III comprises the oscillograph 23, which functions in known manner to indicate the amount of movement of the carrier 8.

I claim:

1. In an apparatus for the measure of very little lengths the combination of an interferometer of the Michelson type having a movable mirror and presenting parallel fringes, a measuring device and a photo-electric sighting device comprising an opaque reticule submitted to a movement of sustained oscillations and provided with transparent slits corresponding in the shape and the geometric position to the brilliant fringes of the interferometer, an object-glass projecting on said reticule the fringes of the interferometer, a photo-electric cell intercepting the light rays crossing said reticule, an electronic device converting the currents issued from the photo-electric cell and consecutive to the fluctuations of the intercepted light flux, in impulses of very short durations, in order that at each coincidence of the brilliant fringes with the slits which occurs during the oscillating movement of the reticule, the light flux crossing said reticule, impinges the photo-electric cell which controls, by the intermediary of the electronic device, the emission of impulses acting on said measuring device, which measuring device indicates the ratio of the elapsed times between two successive coincidences occurring during a whole period of the oscillating movement of said reticule, whereby said ratio is a function of the amplitude of the displacement of said movable mirror of said interferometer.

2. An apparatus according to claim 1 in which said measuring device comprises a commutator controlled by the impulses of said electronic device and an instrument of measure for direct current presenting a great inertia and connected to a source of direct current by the intermediary of said commutator.

3. An apparatus according to claim 1 in which said measuring device comprises an oscillograph fed by the impulses emitted by the electronic device.

4. An apparatus according to claim 1 in which an alternating current electro-magnet oscillates the reticule.

References Cited in the file of this patent

UNITED STATES PATENTS

| | | |
|---|---|---|
| 1,794,340 | Parkhurst | Feb. 24, 1931 |
| 2,462,292 | Snyder | Feb. 22, 1949 |
| 2,540,105 | Dunbar et al. | Feb. 6, 1951 |
| 2,580,498 | Ackerlind | Jan. 1, 1952 |
| 2,596,752 | Williams | May 13, 1952 |

FOREIGN PATENTS

| | | |
|---|---|---|
| 595,940 | Great Britain | Dec. 23, 1947 |